(12) United States Patent
Wessel et al.

(10) Patent No.: US 6,207,318 B1
(45) Date of Patent: Mar. 27, 2001

(54) ELECTROCHEMICAL BATTERIES WITH RESTRICTED LIQUID ELECTROLYTE VOLUME

(75) Inventors: Silvia A. Wessel, Coquitlam; Katherine P. Almond, Vancouver, both of (CA)

(73) Assignee: Eagle-Picher Energy Products Corporation, Surrey (CA)

( * ) Notice: Subject to any disclaimer, the term of this patent is extended or adjusted under 35 U.S.C. 154(b) by 0 days.

(21) Appl. No.: 09/102,436

(22) Filed: Jun. 22, 1998

(51) Int. Cl.$^7$ .................................................. H01M 2/00
(52) U.S. Cl. .................. 429/163; 429/127; 429/131; 429/181; 429/102; 29/623.2
(58) Field of Search .................................. 429/127, 102, 429/181, 131, 163; 29/623.2

(56) References Cited

U.S. PATENT DOCUMENTS

| | | | |
|---|---|---|---|
| 3,663,796 | 5/1972 | Hines et al. | 219/211 |
| 3,675,389 | 7/1972 | Uline | 53/183 |
| 3,990,917 | 11/1976 | Clayman | 429/48 |
| 4,061,163 | 12/1977 | Decker et al. | 141/7 |
| 4,092,464 | * 5/1978 | Dey et al. | 429/127 |
| 4,289,176 | 9/1981 | Evans | 141/35 |
| 4,505,996 | 3/1985 | Simonton | 429/162 |
| 4,507,857 | * 4/1985 | Epstein et al. | 29/623.2 |
| 4,695,519 | 9/1987 | Rao et al. | 429/52 |
| 4,877,695 | * 10/1989 | Cipriano et al. | 429/102 |
| 5,197,994 | 3/1993 | Brocksmith | 29/623.2 |
| 5,212,867 | 5/1993 | Vogel | 29/623.1 |
| 5,326,652 | * 7/1994 | Lake | 429/127 |
| 5,531,601 | 7/1996 | Amoroso | 439/37 |
| 5,588,970 | 12/1996 | Hughett et al. | 29/623.2 |
| 5,667,909 | * 9/1997 | Rodriguez et al. | 429/127 |
| 5,750,282 | * 5/1998 | Chi et al. | 429/49 |

OTHER PUBLICATIONS

Almond, et al., "State of the Art High Performance, Ultrasafe Pouch Cell Li/MnO$_2$ Batteries," Pouch Papers, 38th Power Sources Conference, Cherry Hill, NJ pp. 131–134 (Jun. 8–11, 1998).

Christopher, et al., "Study of Gassing in Lithium/MNO$_2$ Pouch Cells," Proceedings of the Power Sources Conference (37th), Cherry Hill, New Jersey on Jun. 17–20, 1996.

Hoge, et al., "Development of a High Energy Density Lithium–Manganese Dioxide Pouch Cell," 5th Proceedings of the Workshop for Battery Exploratory Development, Burlington, Vermont, pp. 336–338 (Jun. 30–Jul. 3, 1997).

Malinovsky, et al., "Prismatic Lithium/Manganese Dioxide Batteries for High Rate, Low Temperature Applications," Pouch Papers, 38th Power Sources Conference, Cherry Hill, NJ pp. 135–138 (Jun. 8–11, 1998).

Marcoux, et al., "Advanced Primary Battery Development at BlueStar Advanced Technology Corporation," 5th Proceedings of the Workshop for Battery Exploratory Development, Burlington, Vermont, 6 pp. (Jun. 30–Jul. 3, 1997).

* cited by examiner

Primary Examiner—Carol Chaney
Assistant Examiner—Angela J Martin
(74) Attorney, Agent, or Firm—McAndrews, Held & Malloy, Ltd.

(57) ABSTRACT

In a flexible non-aqueous electrochemical cell, the electrolyte resides substantially entirely within the porous anode, cathode, and separator. In manufacturing the flexible non-aqueous electrochemical cell, the volume within the cell available to receive the electrolyte is substantially limited to the pores of the anode, cathode, and separator.

21 Claims, 11 Drawing Sheets

ELECTROCHEMICAL BATTERIES WITH RESTRICTED LIQUID ELECTROLYTE VOLUME

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates to a non-aqueous electrochemical battery comprising an anode, a cathode, a porous separator between the anode and cathode, and a liquid electrolyte, and more particularly to a non-aqueous electrochemical battery contained within a flexible hermetic pouch such that the liquid electrolyte is substantially restricted to pores of one or both electrodes and the porous separator between them. The present invention also relates to a method and apparatus for filling such an electrochemical battery to insure that the electrolyte is substantially restricted to the pores of the electrodes and the separator.

2. Description of the Related Art

The increasing use of portable electronic devices has brought with it an increasing demand for batteries which provide more energy in smaller and lighter units. One approach to meeting these more demanding requirements, for military, commercial and consumer uses, has been to incorporate more active materials, such as lithium or lithiated carbon, as the negative electrode. Lithium batteries, in general, provide higher energy density, higher specific energy, and, usually, longer shelf-life than the traditional dry cell or alkaline batteries.

The selection of a more active negative electrode has a number of design, materials, and operational consequences. In particular, water is no longer an acceptable solvent for the electrolyte. In fact, water must be specifically excluded from the electrolyte and kept from entering the battery from the outside environment. This requirement that lithium batteries be hermetically sealed initially led to the design of battery containers made of stainless steel with glass-to-metal seals surrounding the electrical feed-throughs and requiring a welding step to effect the final hermetic seal. These battery containers are very effective at preventing the entry of moisture from the environment, but also have several disadvantages.

Stainless steel battery containers are heavy and expensive. To reduce component costs, battery containers are typically cylindrical in shape. However, cylindrical batteries do not pack efficiently when several must be combined into a multi-cell battery. A further design and cost disadvantage associated with steel containers is the requirement for a designed weakening in the steel container to allow for a controlled rupture of the battery in the event of either internal or external heating of the battery. The controlled rupture is intended to deactivate the battery to prevent its explosion and the formation of hazardous shrapnel from the steel container.

Steel or other metal containers are required for those non-aqueous batteries which contain pressurized electrolytes, such as the lithium/sulfur dioxide battery. However, the development of lithium-based primary (rechargeable) and secondary (non-rechargeable) batteries using solid positive electrodes and organic solvent-based electrolytes, which have relatively low vapor pressures at operating temperatures, has led to the development of battery containers made of flexible, typically heat-sealable, polymeric films. Such batteries are commonly referred to as "pouch" cells or batteries.

Pouch cells offer significant advantages over cells contained in metal cans. They are less expensive and lighter, and significantly safer, as the flexible container does not allow internal pressures to build to a hazardous level and do not produce hazardous metallic fragments. The flexible containers associated with pouch cells comply with the shape of internal cell components, and they also expand, contract, bend, and otherwise change shape in response to external pressure on the container surfaces. Pouch cells can also be fabricated in a wide variety of shapes to permit efficient packing of many cells into multi-cell batteries or to conform with the shape of the device being powered.

A pouch cell is typically produced by first assembling a sandwich comprising the negative electrode, the separator, and the positive electrode. This assembly may be in the form of alternating flat plates, spirally wound strips, or other configurations known in the art. For the pouch cell, it is common to form a flattened structure in which the electrodes and separator material are wound in the form of an elliptical spiral.

In a separate operation, a pouch is formed, typically from two rectangular sheets of a polymeric film, by sealing them together, typically by a heat-sealing process, along three edges. The polymer film may comprise more than one layer of film to provide the necessary barriers against the ingress of moisture and air from the outside environment, while providing the necessary inertness to attack by the electrolyte solvents. In order to simplify fabrication of the pouch and to facilitate the insertion of the electrode/separator sandwich, the pouch is typically sized such that some space is left between the outer surfaces of the electrode/separator sandwich and the inner surfaces of the pouch.

After the electrode/separator sandwich has been placed in the pouch, the open end of the pouch is closed by the insertion of a cap unit or the sealing of the fourth edge. The sealing of the pouch may involve heat-sealing and/or adhesives. The final sealing design and process must make provisions for the passage of electrical connectors from the inside to the outside of the pouch and must also make provisions for the subsequent introduction of the electrolyte solution and the final sealing of that means of introduction.

In the prior art, the introduction of the electrolyte has typically been accomplished by first evacuating the sealed pouch cell to remove air from the pouch and its contents. A predetermined volume of electrolyte is then injected into the cell. This is followed by sealing the filling tube or orifice, depending upon the design.

The pouch cell designed and filled according to the prior art will have something of a pillow shape, due to the bulging of the flexible pouch caused by the filling of the space, between the electrode/separator assembly and the inner surface of the pouch, with electrolyte solution. This bulging is undesirable in that it increases the volume of the cell over that of the active components alone, and thus reduces the energy density. The bulging also represents an unnecessary expenditure, due to the presence of unneeded electrolyte. It has also been found that the prior art design and method of filling pouch cells with electrolyte solution is inefficient in filling the pores of the electrodes and separator, where electrolyte is necessary for the production of electricity. Instead, electrolyte preferentially fills the void space around the active components rather than the pores of the electrodes and separator as required for maximum utilization of the active components.

SUMMARY OF THE INVENTION

The non-aqueous electrochemical battery of the present invention comprises a negative electrode, a positive electrode, a porous separator positioned between the negative and positive electrodes, a non-aqueous electrolyte and a flexible container enclosing the electrodes, separator, and electrolyte. The electrolyte resides substantially in the pores of the electrodes and the separator. The electrochemical battery may be designed for a single discharge (primary battery) or for multiple discharges and recharges (secondary battery).

In a first embodiment, the battery is non-rechargeable. In the preferred first embodiment, the negative electrode comprises a material which is selected from the group consisting of alkali metals, alkaline earth metals, alkali metal alloys, and alkaline earth metal alloys. Most preferably, the negative electrode comprises lithium. In the preferred first embodiment, the liquid solvent of the electrolyte is selected from the group consisting of linear carbonate esters, cyclic carbonate esters, linear ethers, cyclic ethers, and mixtures thereof. In the preferred first embodiment, the conductive salt of the electrolyte is selected from the group consisting of $LiClO_4$, $LiBF_4$, $LiAsF_6$, $LiCF_3SO_3$, $LiN(CF_3SO_2)_2$, and $LiC(CF_3SO_2)_3$. Most preferably, the electrolyte comprises $LiClO_4$, propylene carbonate, tetrahydrofuran, and dimethoxyethane. In the preferred first embodiment, the positive electrode comprises a binder, a conductant, and a transition metal compound, where conductant is defined as a material added to enhance electrical conductivity. Most preferably, the positive electrode comprises manganese dioxide, carbon, and a fluorocarbon binder coated on an expanded metal substrate.

In a second embodiment, the battery is rechargeable. In the preferred second embodiment, the negative electrode electroactive material is selected from the group consisting of lithiated carbon, lithiated nitrogen-doped carbon, boron-doped carbon, phosphorus-doped carbon, lithiated metal oxides, and lithiated metal sulfides. Most preferably, the negative electrode is lithiated graphite. In the preferred second embodiment, the liquid solvent of the electrolyte is selected from the group consisting of linear carbonate esters, cyclic carbonate esters, linear carboxylic acid esters, cyclic carboxylic acid esters, linear ethers, cyclic ethers, and mixtures thereof. In the preferred second embodiment, the conductive salt of the electrolyte is selected from the group consisting of $LiClO_4$, $LiBF_4$, $LiAsF_6$, $LiCF_3SO_3$, $LiN(CF_3SO_2)_2$, $LiC(CF_3SO_2)_3$, and $LiPF_6$. Most preferably, the electrolyte comprises $LiPF_6$, ethylene carbonate, and one of ethyl methyl carbonate, diethyl carbonate, and a mixture of diethyl carbonate and dimethyl carbonate. In the preferred second embodiment, the positive electrode comprises a binder, a conductant, and an electroactive transition metal oxide. Most preferably, the positive electrode comprises polyvinylidene fluoride, carbon, and a lithiated cobalt oxide on a conducting substrate.

In another aspect of the present invention, an electrolyte filling device which surrounds and compresses the flexible container during filling is used to force substantially all of the electrolyte solution into the pores of the electrodes and the separator and to substantially prevent the introduction of electrolyte solution into the space between the electrode/separator assembly and the flexible container.

By use of the present invention, the volume, weight, and cost of the electrochemical battery are reduced and the utilization of the active components is improved. These and other advantages of the present invention will become apparent to those skilled in the art upon reading and understanding the following detailed description with reference to the accompanying figures.

BRIEF DESCRIPTION OF THE DRAWINGS

FIG. 1b is an end section view taken in the direction of arrows b—b in FIG. 1a.

DETAILED DESCRIPTION OF THE PREFERRED EMBODIMENT

Figure 1A:
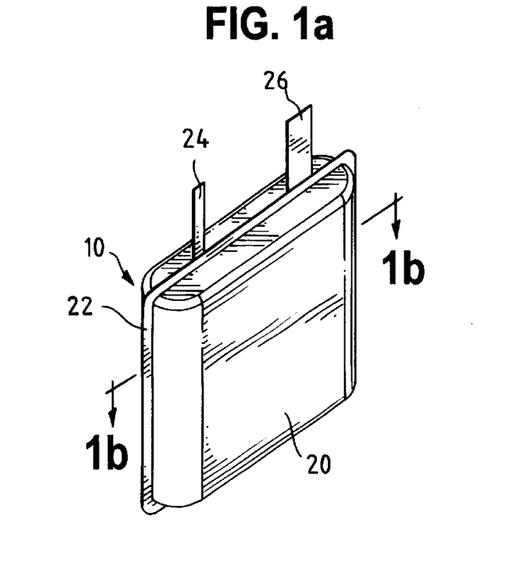
FIG. 1a is a perspective view of an electrochemical cell of the present invention.
Figure 1B:
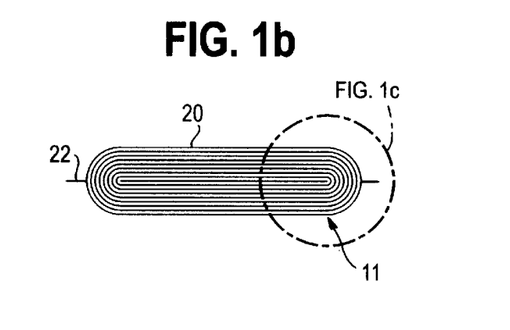
Figure 1C:
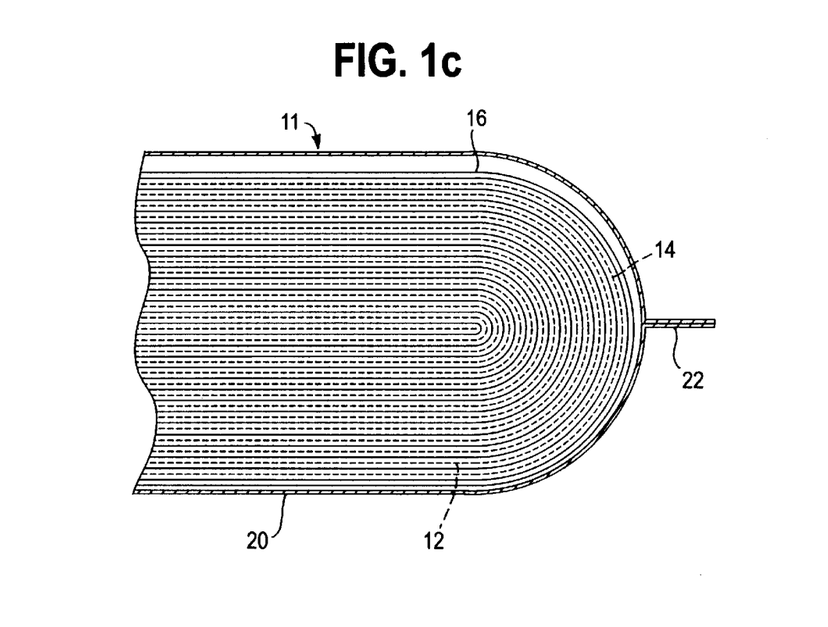
FIG. 1c is an enlarged view of the area circled in FIG. 1b.

Reference is first made to FIGS. 1a, 1b and 1c in which the components of a typical pouch cell are presented. FIG. 1a shows an electrochemical cell 10 having pouch 20 with the sealed edge 22 around the periphery of the pouch 20. Also shown in FIG. 1a are the electrical contacts 24 and 26 which are attached to the positive and negative electrodes within the cell. Care must be taken in sealing the pouch that the seals around contacts 24 and 26 are hermetic.

The typical electrode/separator assembly 11, shown in FIG. 1b and shown magnified in FIG. 1c comprises a strip of negative electrode material 12, a strip of positive electrode material 14, and a strip of porous separator 16, arranged such that the separator, placed between the two electrodes, insulates the two electrodes from one another while permitting ionic contact due to the electrolyte solution residing in the pores of the separator. While the electrode/separator assembly may also be formed as a sandwich of substantially flat electrode and separator units, FIG. 1b and FIG. 1c show the more common elliptical spiral arrangement.

Figure 2A:
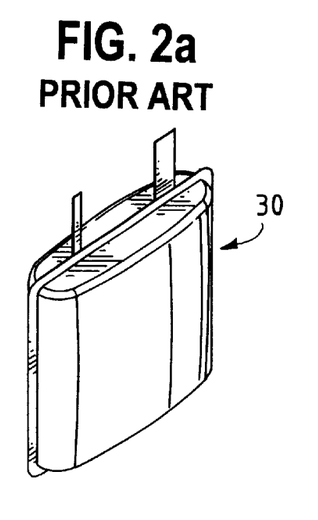
FIGS. 2a and 2b are perspective and side views, respectively, of a typical pouch cell when filled with electrolyte according to the prior art.
Figure 2B:
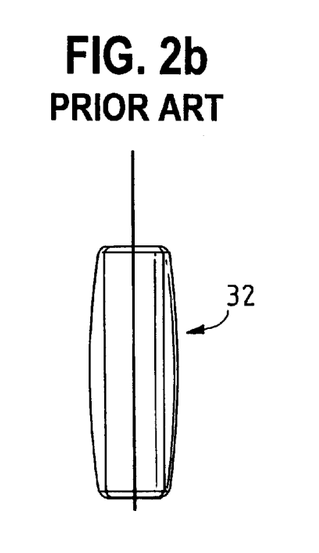
Figure 3A:
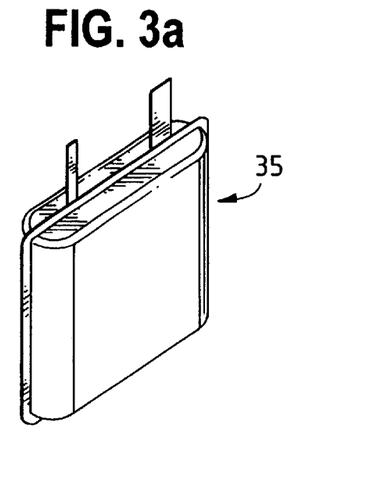
FIGS. 3a and 3b are perspective and side views, respectively, of a typical pouch cell when filled with electrolyte according to the present invention.
Figure 3B:
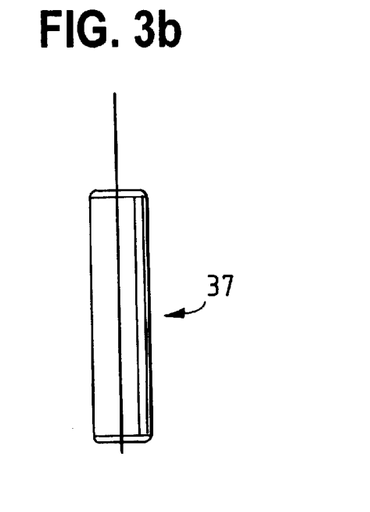

When a pouch cell, as shown in FIG. 1a, is filled with a liquid electrolyte solution according to the prior art, the cell will be found to bulge, as shown in FIGS. 2a and 2b, due to the presence of electrolyte solution in the region between the outer surface of the electrode/separator assembly and the inner surface of the flexible pouch. In contrast, pouch cells filled with electrolyte solution according to the present invention retain the shape and volume characteristic of the electrode/separator assembly and do not bulge, as shown in FIGS. 3a and 3b.

Figure 4A:
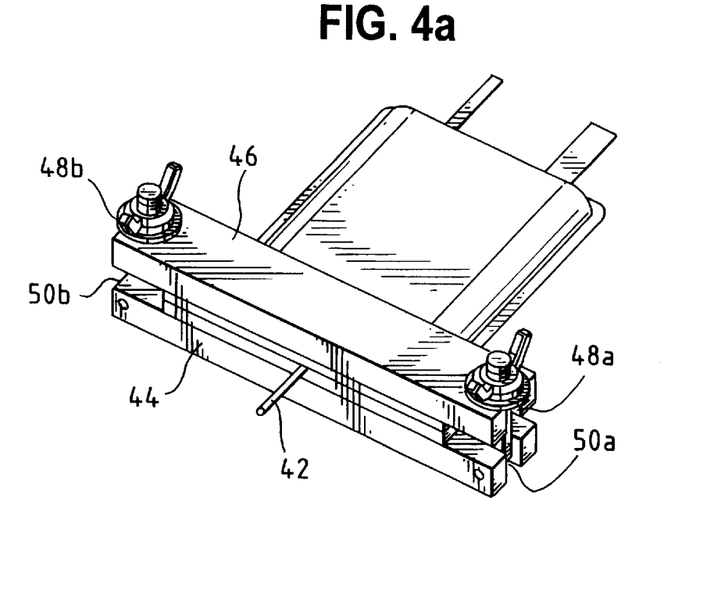
FIGS. 4a and 4b are perspective views of the two parts of the filling apparatus of the present invention.
Figure 4B:
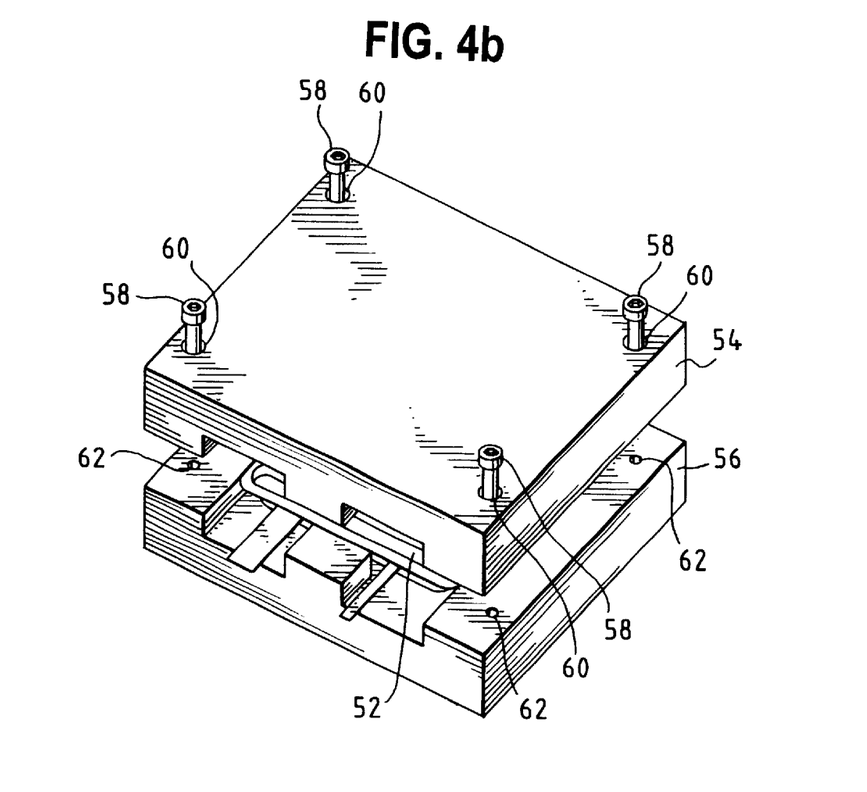

The present invention is carried out by the use of a filling fixture which surrounds and compresses the flexible pouch during filling. One such device is shown in FIGS. 4a and 4b. In this embodiment the filling fixture consists of two assemblies, one shown in FIG. 4a surrounds and compresses the region around the electrolyte solution filling tube 42 to assure no leakage around the tube prior to its being sealed. This assembly consists of two mating parts 44 and 46 which are held together by bolts inserted into the notches 48a and 48b formed in part 46 and the corresponding notches 50a and 50b formed in part 44.

As shown in FIG. 4b, the main body of the flexible pouch 52 is surrounded and compressed by a second pair of mating parts 54 and 56 which are held together and urged toward each other by bolts 58 through associated holes 60 and 62 (one not visible) in parts 54 and 56 respectively.

EXAMPLE 1

Unrestrained-Fill

As an example of the prior art, a lithium/manganese dioxide pouch cell was assembled. The negative electrode was a lithium foil with an imbedded copper current collector of dimensions 33.5"×2.30"×0.10". The manganese dioxide positive electrode was formed by processes well known in the art which involve adhering a thin layer of manganese dioxide with a conductive additive, such as carbon, and a binder, such as PTFE, to a thin expanded metal substrate, such as aluminum. The dimensions of the positive electrode were 30.38"×2.38"×0.028". The two electrodes were separated by a thin, porous polypropylene material and the electrode/separator sandwich wound into an elliptical spiral, as shown in FIG. 1b. In the winding process, space was made for a 1/16" diameter fluorocarbon tube to serve as the means for filling the cell with electrolyte.

A piece of laminated polymeric film was folded in half and heat-sealed along the fold. The electrode/separator assembly was then placed between the two layers of film and heat seals were made along the other three sides, completely enclosing the electrode/separator assembly within the film pouch. The seals were approximately 0.3" wide and the final pouch was only slightly larger than the electrode/separator assembly.

The fill tube, which protruded from the pouch, was attached to a device which evacuated the pouch and its contents to a pressure of less than 100 microns. A predetermined volume of liquid electrolyte solution comprising $LiClO_4$, propylene carbonate, tetrahydrofuran, and dimethoxyethane was then introduced into the cell via the fill tube. A total of 27.3 g of electrolyte was added.

The process was then repeated for a second cell comprised of components of similar dimensions. A total of 31.1 g of electrolyte was added to this second cell. Both of the pouch cells were observed to be swollen, as shown in FIGS. 2a and 2b.

Figure 5A:
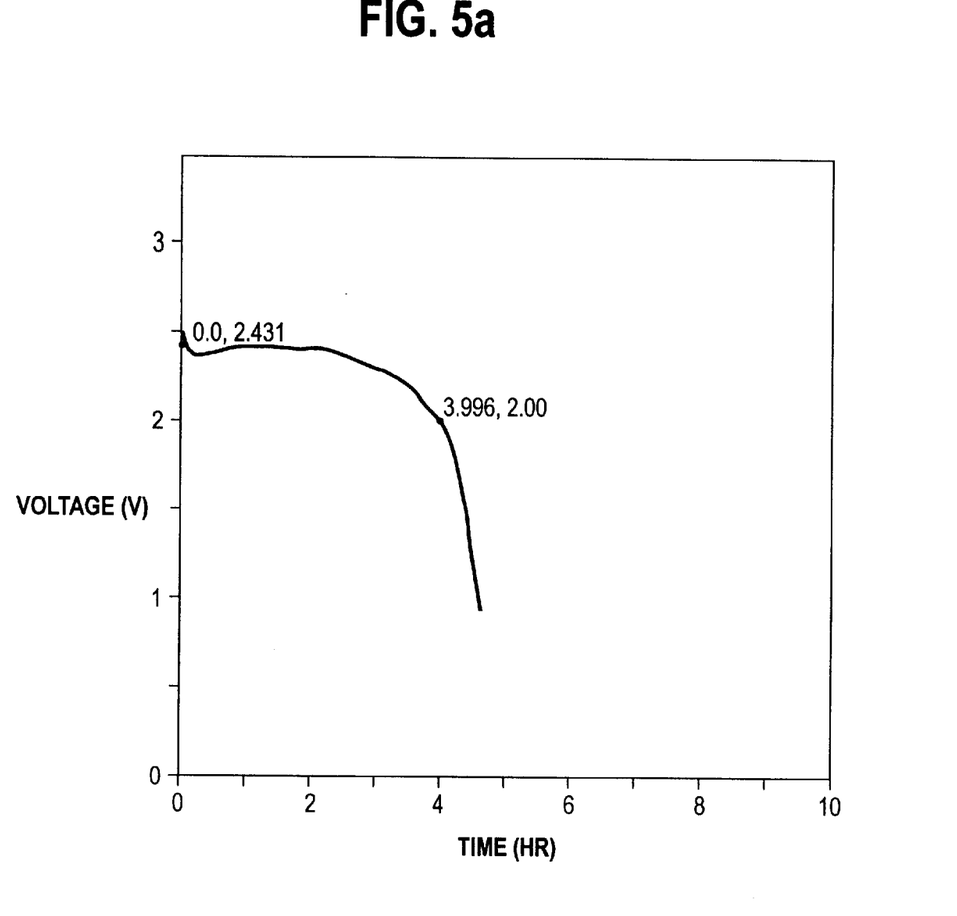
FIGS. 5a and 5b are typical discharge curves for primary pouch cells of the prior art.
Figure 5B:
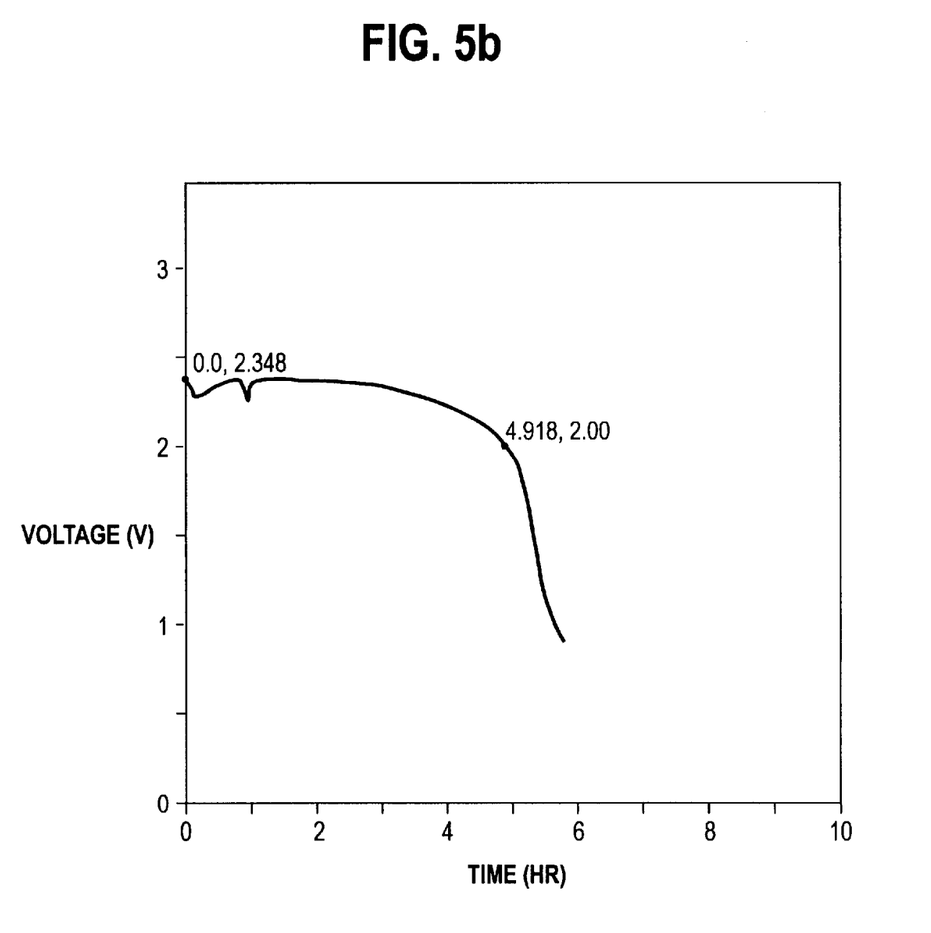

The discharge curve for the 27.3 g electrolyte cell is shown in FIG. 5a, where the cell capacity to a cut-off voltage of 2.0 Volts was found to be 12.0 Ah, and the average voltage during the initial 2 hours of discharge was found to be 2.4 volts. The discharge curve for the 31.1 g of electrolyte cell is shown in FIG. 5b, where the cell capacity to a cut-off voltage of 2.0 Volts was found to be 14.8 Ah, and the average voltage during the initial 2 hours of discharge was found to be 2.3 volts.

EXAMPLE 2

Restrained-Fill

A pouch cell substantially identical to that of Example 1 was assembled. It was then placed in the filling fixture shown in FIG. 4 and filled as described in Example 1. Filling was completed with only 21.4 g of electrolyte. This procedure was repeated for a second cell which was filled with 22.7 g of electrolyte. The pouch cells were not swollen, as shown in FIGS. 3a and 3b.

Figure 6A:
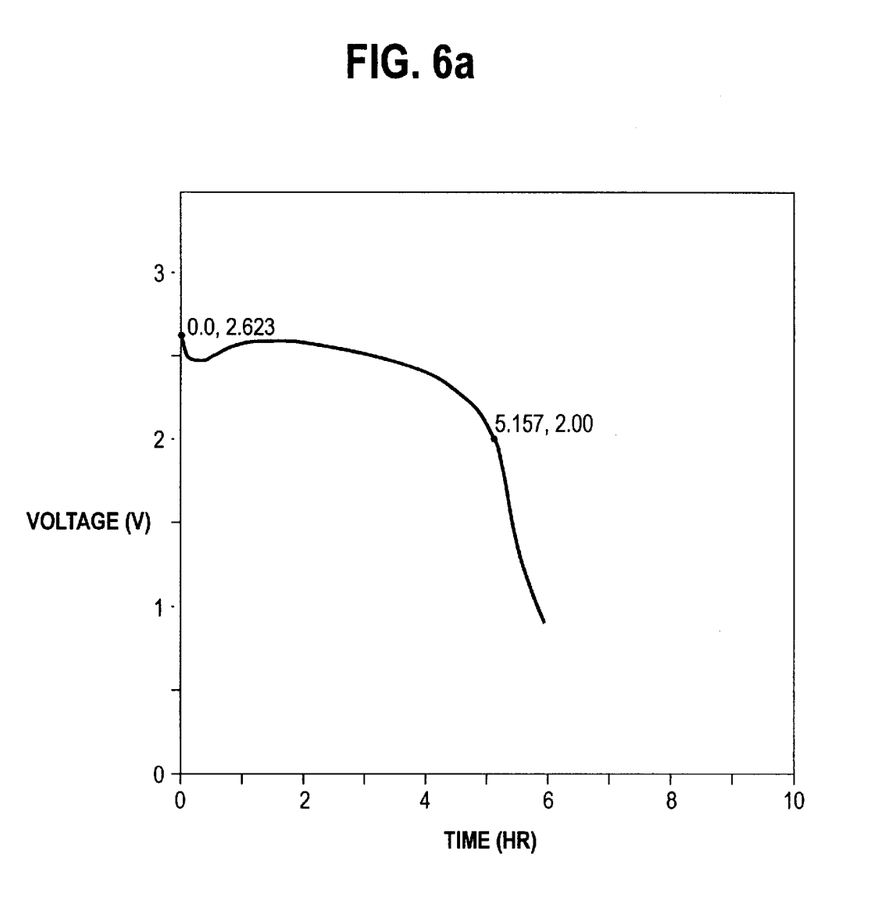
FIGS. 6a and 6b are discharge curves for primary pouch cells of the present invention.
Figure 6B:
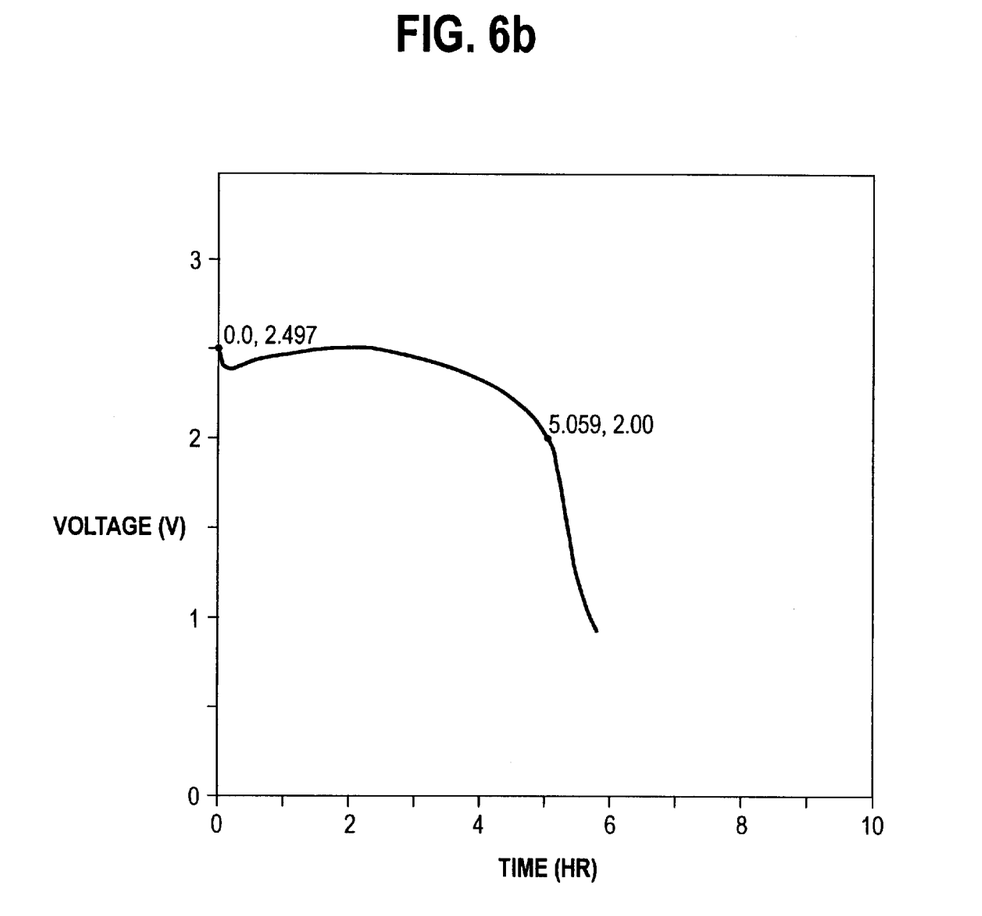

The discharge curve for the 21.4 g electrolyte cell is shown in FIG. 6a, where the cell capacity to a cut-off voltage of 2.0 Volts was found to be 15.5 Ah, and the average voltage during the initial 2 hours of discharge was found to be 2.6 volts. The discharge curve for the 22.7 g of electrolyte cell is shown in FIG. 6b, where the cell capacity to a cut-off voltage of 2.0 Volts was found to be 15.2 Ah, and the average voltage during the initial 2 hours of discharge was found to be 2.5 volts.

Comparing the results of Examples 1 and 2, it is apparent that restricting the electrolyte fill volume substantially to the porous active components results in a significantly more efficient electrolyte utilization than that found in conventionally filled (unrestrained-fill) cells. An increase in electrolyte volume of approximately 50% is necessary to match the capacity of the restrained-fill cells. Another observation from the results is that a significant cell volume reduction is achieved allowing the physically smaller restrained-fill cell of Example 2 to perform as well or better than the physically larger unrestrained-fill cell of Example 1. It should also be noted that the average voltage during discharge for the restrained-fill cells in Example 2 is significantly higher than that for the unrestrained-fill cells in Example 1. Such a higher voltage is generally advantageous and is particularly advantageous if the cells are to be used at lower temperatures.

EXAMPLE 3

Restrained-Fill vs. Unrestrained-Fill at Like Volume

Three pouch cells substantially identical to that of Examples 1 and 2 were assembled. Two cells were then filled as the cells were filled in Example 1, and one cell was filled as the cells were filled in Example 2. The electrolyte fill amounts for all three cells were kept within 2.1% of 23.4 g.

Figure 7A:
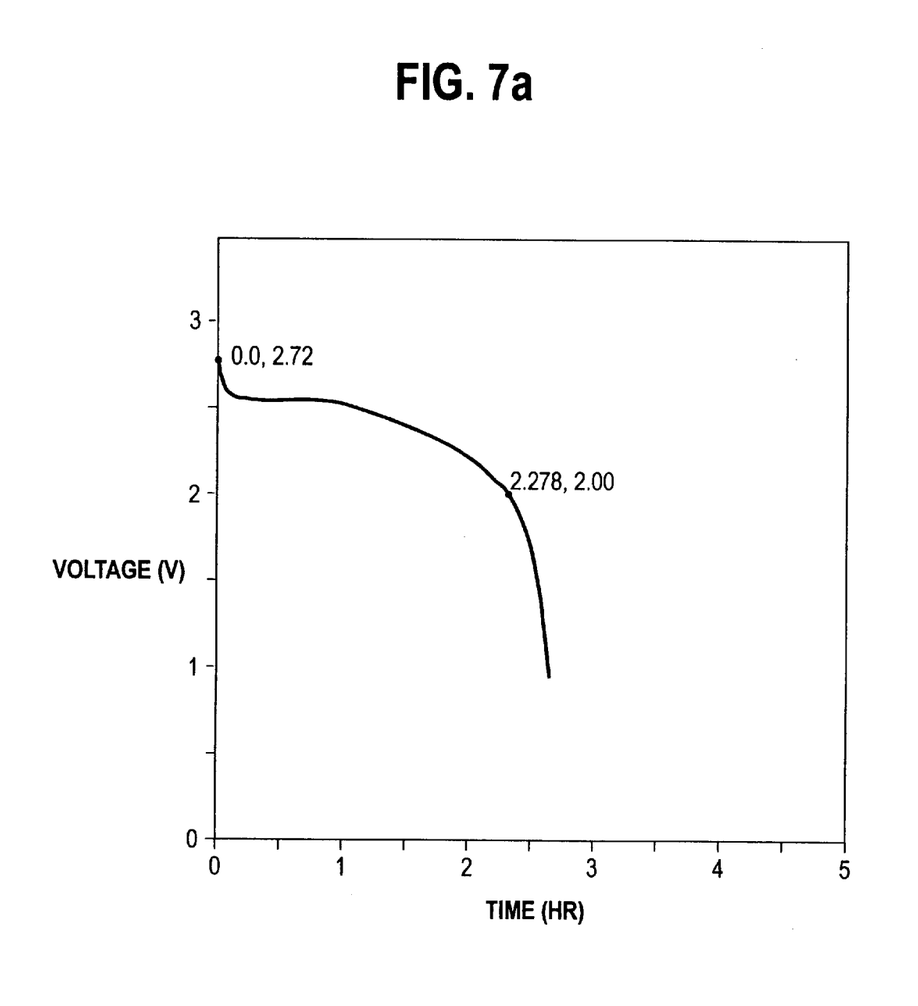
FIGS. 7a, 7b, and 7c are discharge curves for primary pouch cells of the prior art and of the present invention at similar electrolyte volumes.
Figure 7B:
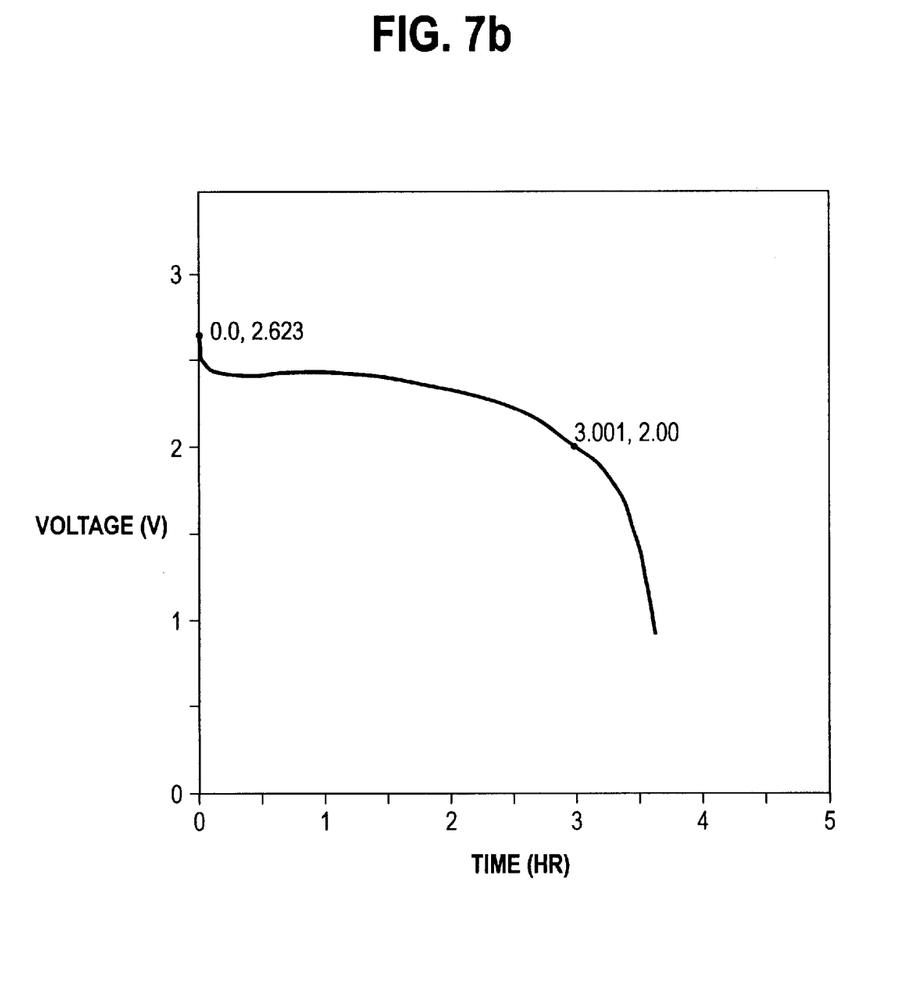
Figure 7C:
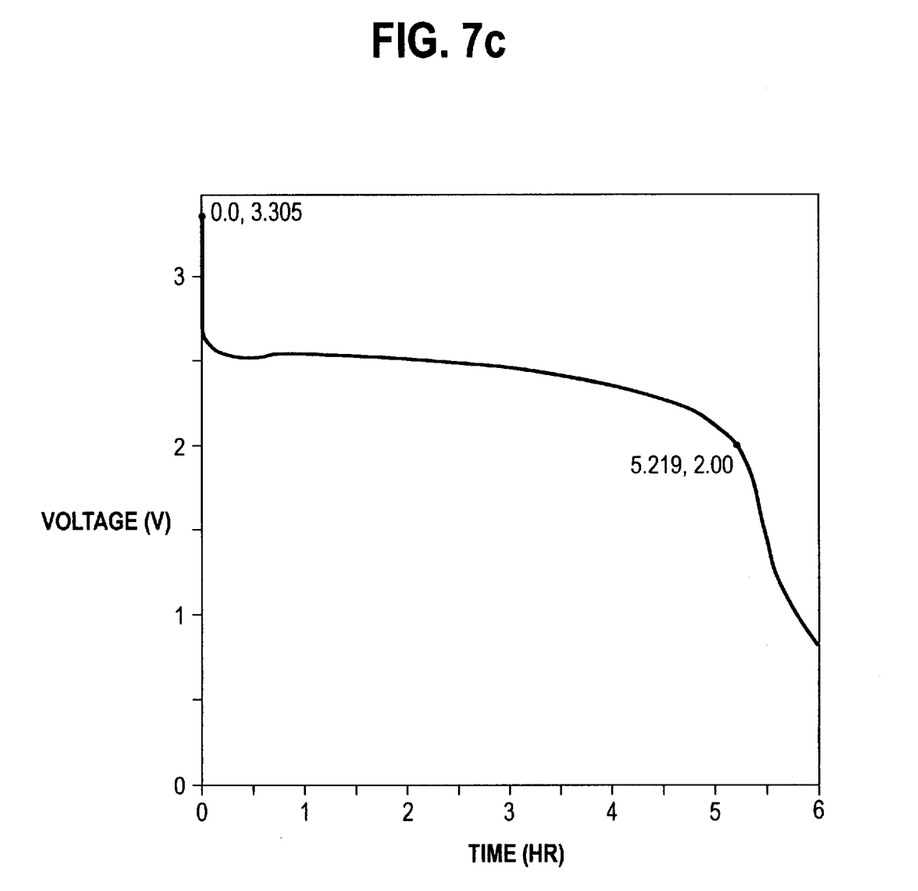

The discharge curves for the two cells filled as in Example 1 (unrestrained-fill) are shown in FIG. 7a and FIG. 7b. The cell capacities to a cut-off voltage of 2.0 Volts were found to be 6.8 Ah and 9.0 Ah. The discharge curve for the cell filled as in Example 2 (restrained-fill) is shown in FIG. 7c. The cell capacity to a cut-off voltage of 2.0 Volts was found to be 15.7 Ah.

Again, the results indicate more efficient electrolyte utilization for the restrained-fill cell relative to the unrestrained-fill cell, as indicated by the increased capacity and higher average operating voltage.

EXAMPLE 4

Secondary Cell Restrained-Fill vs. Unrestrained-Fill

Figure 8:
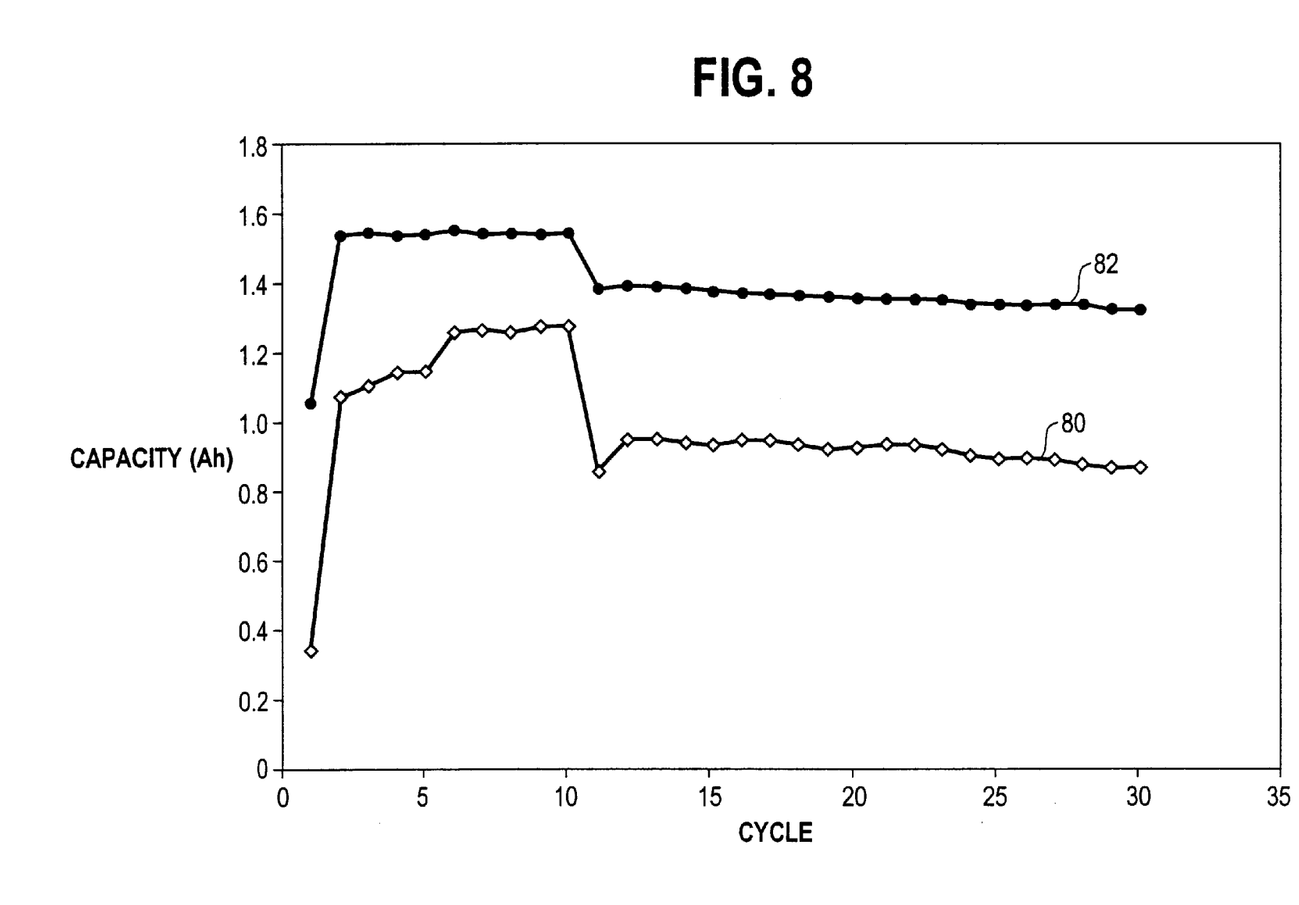
FIG. 8 is a composite plot of cycling data for secondary pouch cells of the prior art and of the present invention.

A secondary (rechargeable) pouch cell comprising a porous carbon negative electrode, a lithiated cobalt oxide positive electrode, and an electrolyte comprising $LiPF_6$, ethylene carbonate, and diethyl carbonate was assembled using techniques known in the art and the processes described in Example 1. Upon filling the pouch cell, as described in Example 1, a similar bulging of the cell was observed. The data for the first 30 discharge cycles 80 for this cell is plotted in FIG. 8.

A second secondary (rechargeable) pouch cell substantially similar to the first cell described in this Example 4 was filled with liquid electrolyte solution as described in Example 2. The cell did not exhibit the bulging of the first cell. The data for the first 30 discharge cycles 82 for this cell is plotted in FIG. 8.

From the data resulting from this example, the increased electrolyte utilization achieved with restrained-fill primary cells is also achieved for restrained-fill secondary cells.

What is claimed is:

1. A non-aqueous electrochemical cell comprising:
   a negative electrode;
   a positive electrode;
   a porous separator positioned between said negative electrode and said positive electrode;
   an electrolyte solution comprising a liquid solvent and a conductive salt; and
   a flexible, fluid impermeable container containing said negative electrode, said positive electrode, said separator, and said electrolyte solution, wherein substantially all of said electrolyte solution fills the pores of both of said electrodes and said separator, and introduction of said electrolyte solution into the space between said electrodes and said flexible container is substantially prevented.

2. The electrochemical cell of claim 1 wherein said cell is non-rechargeable.

3. The electrochemical cell of claim 2 wherein said negative electrode comprises a material selected from the group consisting of alkali metals, alkaline earth metals, alkali metal alloys, and alkaline earth metal alloys.

4. The electrochemical cell of claim 3 wherein said negative electrode comprises lithium.

5. The electrochemical cell of claim 2 wherein said liquid solvent is selected from the group consisting of linear carbonate esters, cyclic carbonate esters, linear ethers, cyclic ethers, and mixtures thereof.

6. The electrochemical cell of claim 2 wherein said conductive salt is selected from the group consisting of $LiClO_4$, $LiBF_4$, $LiAsF_6$, $LiCF_3SO_3$, $LiN(CF_3SO_2)_2$, and $LiC(CF_3SO_2)_3$.

7. The electrochemical cell of claim 2 wherein said electrolyte solution comprises $LiClO_4$, propylene carbonate, tetrahydrofuran, and dimethoxyethane.

8. The electrochemical cell of claim 2 wherein said positive electrode comprises a binder, a conductant, and a transition metal compound coated on a conductive substrate.

9. The electrochemical cell of claim 8 wherein said transition metal compound is selected from the group consisting of oxides of manganese, vanadium, tungsten, copper, and chromium, and sulfides of iron, molybdenum, vanadium, and copper.

10. The electrochemical cell of claim 9 wherein said positive electrode comprises a fluorocarbon binder, carbon, and manganese dioxide which are coated on an expanded metal conductive substrate.

11. The electrochemical cell of claim 1 wherein said cell is rechargeable.

12. The electrochemical cell of claim 11 wherein said negative electrode comprises an electroactive material selected from the group consisting of lithiated carbon, lithiated nitrogen-doped carbon, boron-doped carbon, phosphorus-doped carbon, lithiated metal oxides, and lithiated metal sulfides.

13. The electrochemical cell of claim 12 wherein the said electroactive material is lithiated graphite.

14. The electrochemical cell of claim 11 wherein said liquid solvent is selected from the group consisting of linear carbonate esters, cyclic carbonate esters, linear carboxylic acid esters, cyclic carboxylic acid esters, linear ethers, cyclic ethers, and mixtures thereof.

15. The electrochemical cell of claim 11 wherein said conductive salt is selected from the group consisting of $LiClO_4$, $LiBF_4$, $LiAsF_6$, $LiCF_3SO_3$, $LiN(CF_3SO_2)_2$, $LiC(CF_3SO_2)_3$, and $LiPF_6$.

16. The electrochemical cell of claim 11 wherein said electrolyte solution comprises $LiPF_6$, ethylene carbonate, and ethyl methyl carbonate.

17. The electrochemical cell of claim 11 wherein said electrolyte solution comprises $LiPF_6$, ethylene carbonate, and diethyl carbonate.

18. The electrochemical cell of claim 11 wherein said electrolyte solution comprises $LiPF_6$, ethylene carbonate, diethyl carbonate, and dimethyl carbonate.

19. The electrochemical cell of claim 11 wherein said positive electrode comprises a binder, a conductant, and an electroactive transition metal oxide coated on a conductive substrate.

20. The electrochemical cell of claim 19 wherein said electroactive transition metal oxide is selected from the group consisting of lithiated cobalt oxides, lithiated nickel oxides, lithiated manganese oxides, and compounds of lithiated mixed transition metal oxides.

21. The electrochemical cell of claim 20 wherein said positive electrode comprises polyvinylidene fluoride, carbon, and a lithiated cobalt oxide which are coated on a conducting substrate.

* * * * *